(No Model.)
G. D. FERRIS.
MECHANICAL MOVEMENT.
No. 331,695. Patented Dec. 1, 1885.
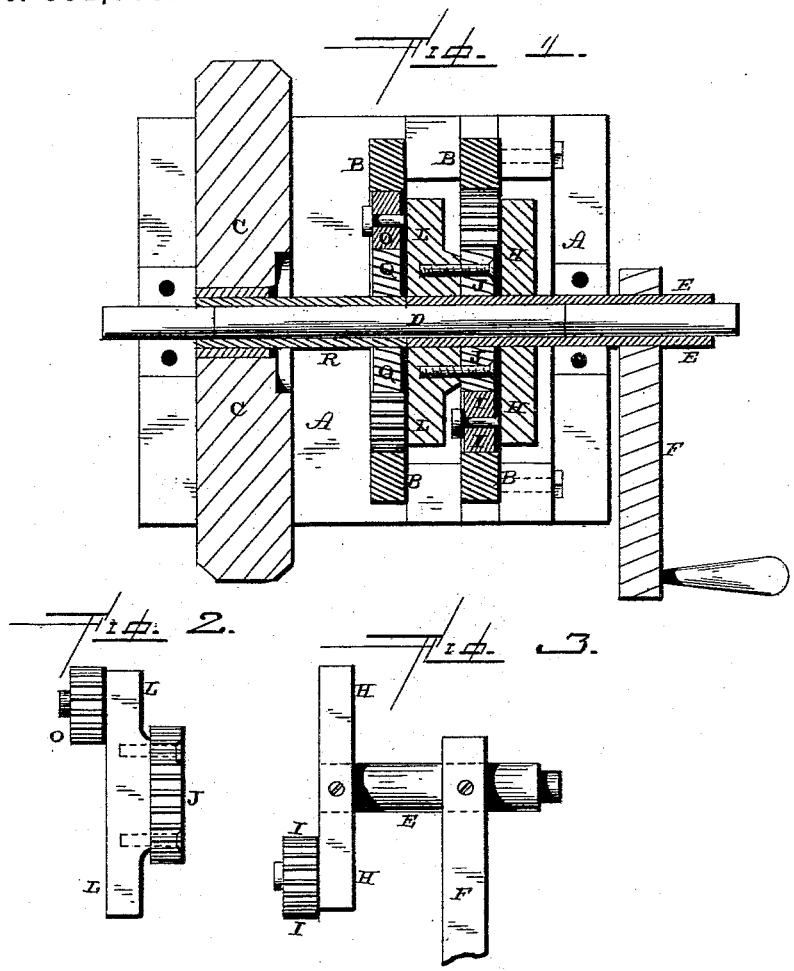
Witnesses.
L. F. Gardner
Jno. E. Prosperi
Inventor:
Geo. D. Ferris,
per
F. A. Lehmann,
Atty.

UNITED STATES PATENT OFFICE.

GEORGE D. FERRIS, OF SPRINGFIELD, ILLINOIS.

MECHANICAL MOVEMENT.

SPECIFICATION forming part of Letters Patent No. 331,695, dated December 1, 1885.

Application filed August 18, 1885. Serial No. 174,685. (No model.)

*To all whom it may concern:*

Be it known that I, GEORGE D. FERRIS, of Springfield, in the county of Sangamon and State of Illinois, have invented certain new and useful Improvements in Mechanical Movements; and I do hereby declare the following to be a full, clear, and exact description of the invention, such as will enable others skilled in the art to which it pertains to make and use it, reference being had to the accompanying drawings, which form part of this specification.

My invention relates to an improvement in mechanical movements; and it consists in the combination of a suitable frame-work, two or more stationary internally-toothed disks, the wheels, a central shaft, two or more sleeves placed upon the shaft, spur-gears which are placed in the center of the fixed toothed disks, levers carrying pinions which mesh both with the teeth of the disks, the spur-gears, and a fly-wheel, all of which will be more fully described hereinafter.

The object of my invention is to provide a mechanical movement for the purpose of multiplying speed, whereby a single revolution of the crank applied to the main driving-shaft will cause the fly-wheel to give any desired number of revolutions, and thus multiply the speed to any desired degree.

Figure 1 represents a horizontal section of a movement embodying my invention. Figs. 2 and 3 are detail views of the same.

A represents a suitable frame-work, in which are rigidly secured, in any desired manner, two or more stationary internally-toothed disks, B. There will be a number of these disks, proportioned to the speed that it is desired to give to the driving-wheel C. Journaled in this frame-work is a central shaft, D, upon the outer end of which is placed the loosely-revolving sleeve E, which sleeve has the driving-crank F secured at one end to receive the motive power, and which has at the other end the arm or lever H. Upon one or both ends of this lever H is placed a pinion, I, which pinion meshes both with the teeth of the disk B and with the teeth of the spur-gear J. This spur-gear J turns loosely upon the driving-shaft, and has secured to or formed with it a lever, L, which carries one or more pinions, O. This pinion meshes with the teeth of the second disk B, and with the teeth of the spur-gear Q, which is rigidly secured to the sleeve R. When the motive power is applied to the driving-crank, the lever H is made to sweep around, carrying the pinion I with it, and this pinion meshes both with the spur-wheel J and the fixed disk B. The spur-gear J is thus made to revolve, and it in turn causes the second lever, carrying the pinion O, to revolve, and the revolution of this pinion O causes the sleeve R, carrying the second spur-gear, to revolve at a greatly-increased rate of speed. These spur-gears, levers carrying pinions, and stationary toothed disks may be increased in number according to the rate of speed that is desired, the pinions, spur-gears, and toothed disks being given any desired size or any relative number of teeth for the purpose of increasing the speed in any desired ratio. The central shaft, D, extends about half-way through the bearings upon each side, and has both of its ends journaled in the sleeves, which revolve in the same direction. The shaft is prevented from moving out of its position by means of a plug which is placed in the sleeve to which the crank is attached, and at the opposite end by means of a second shaft which is secured to the sleeve, and which extends beyond it for the purpose of forming a second bearing for the fly-wheel. The fly-wheel is then fastened to this shaft. As the parts are here constructed the first pinion causes the first spur-gear to revolve three times to one revolution of the crank. The second pinion causes the second spur-gear to make nine revolutions to one of the crank. A third pinion and spur-gear would cause twenty-seven revolutions to one of the crank. The fourth would cause eighty-one revolutions, and so on in that proportion.

Having thus described my invention, I claim—

In a mechanical movement, the combination of an internally-toothed disk, the driving-crank, a central shaft, a series of sleeves placed upon the shaft, a series of spur-gears, revolving levers or arms carrying the pinions, which mesh both with the internally-toothed disks and the spur-gears, and the driving-wheel, all being arranged to operate substantially as shown and described.

In testimony whereof I affix my signature in presence of two witnesses.

GEORGE D. FERRIS.

Witnesses:
B. F. CROUSE,
WM. STONEBERGER.